(12) United States Patent
Nagaraja (10) Patent No.: US 8,332,708 B2
(45) Date of Patent: Dec. 11, 2012

(54) DATA TRANSMISSION WITH MULTI-LEVEL ACK/NACK FEEDBACK

(75) Inventor: Nagendra Nagaraja, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 12/775,769

(22) Filed: May 7, 2010

(65) Prior Publication Data

US 2011/0276851 A1 Nov. 10, 2011

(51) Int. Cl.
*H04L 1/18* (2006.01)

(52) U.S. Cl. ........................................ 714/748

(58) Field of Classification Search ................... 714/748
See application file for complete search history.

(56) References Cited

U.S. PATENT DOCUMENTS

| | | | | |
|---|---|---|---|---|
| 7,185,256 B2 * | 2/2007 | Miki et al. | ..................... | 714/751 |
| 7,433,328 B2 * | 10/2008 | Kim et al. | ..................... | 370/278 |
| 7,447,968 B2 * | 11/2008 | Ha et al. | ..................... | 714/748 |
| 7,505,417 B2 * | 3/2009 | Huh et al. | ..................... | 370/245 |
| 7,653,856 B2 * | 1/2010 | Ahn et al. | ..................... | 714/748 |
| 7,751,382 B2 * | 7/2010 | Ranta-Aho et al. | ........... | 370/345 |
| 7,848,385 B2 * | 12/2010 | Nakao et al. | ................... | 375/130 |
| 7,995,462 B2 * | 8/2011 | Gao et al. | ...................... | 370/216 |
| 8,042,018 B2 * | 10/2011 | Heo et al. | ..................... | 714/748 |
| 8,064,429 B2 * | 11/2011 | Roberts et al. | ................ | 370/350 |
| 2006/0126513 A1 | 6/2006 | Li et al. | | |

FOREIGN PATENT DOCUMENTS

WO WO0201743 A1 1/2002
WO WO2006138196 12/2006

OTHER PUBLICATIONS

International Search Report and Written Opinion—PCT/US2011/035428—ISA/EPO—Aug. 1, 2011.

\* cited by examiner

*Primary Examiner* — James C Kerveros
(74) *Attorney, Agent, or Firm* — Eric Ho (57) ABSTRACT

Techniques for transmitting and receiving data with multi-level feedback of acknowledgement (ACK) and negative acknowledgement (NACK) are described. In an aspect, a receiver may send a NACK if high peak-to-average-power ratio (PAPR) is detected for a transmission of a packet. A transmitter may adjust at least one transmission parameter (e.g., increase back-off of a power amplifier) in response to receiving the NACK from the receiver. In another aspect, a receiver may send a NACK of a first type (NACK Type 1) if high PAPR is detected for a transmission of a packet and may send a NACK of a second type (NACK Type 2) if the packet is decoded in error. A transmitter may treat NACK Type 1 and NACK Type 2 in similar manner and may send another transmission of the packet.

40 Claims, 6 Drawing Sheets

DATA TRANSMISSION WITH MULTI-LEVEL ACK/NACK FEEDBACK

BACKGROUND

I. Field

The present disclosure relates generally to communication, and more specifically to techniques for transmitting and receiving data in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support hybrid automatic retransmission (HARQ) in order to improve reliability of data transmission. For HARQ, a transmitter may send a transmission of a data packet to a receiver and may send one or more additional transmissions of the packet, if needed, until the packet is decoded correctly by the receiver, or the maximum number of transmissions has been sent for the packet, or some other termination condition is encountered. Each transmission of the packet may include different redundancy information for the packet and may be referred to as an HARQ transmission. The receiver may decode the packet based on all HARQ transmissions received for the packet, which may improve the likelihood of correctly decoding the packet.

HARQ may improve performance of data transmission. However, the processing at the receiver for each HARQ transmission may be computationally intensive and may also introduce undesirable delay. There is therefore a need in the art for techniques to efficiently transmit and receive data.

SUMMARY

Techniques for transmitting and receiving data with multi-level feedback of acknowledgement (ACK) and negative acknowledgement (NACK) are described herein. In an aspect, a receiver may send a NACK if high peak-to-average-power ratio (PAPR) is detected. A transmitter may adjust at least one transmission parameter (e.g., increase back-off of a power amplifier) in response to receiving NACK from the receiver. In one design, the receiver may receive a transmission of a packet and may determine a PAPR of the transmission. The receiver may compute the PAPR or may receive the PAPR from the transmitter. The receiver may compare the PAPR of the transmission against a threshold and may detect high PAPR if the PAPR of the transmission exceeds the threshold. The receiver may send NACK if high PAPR is detected. The receiver may decode the packet if high PAPR is not detected and may skip decoding of the packet if high PAPR is detected.

In another aspect, a receiver may send a negative acknowledgement of a first type (NACK Type 1) if high PAPR is detected and may send a negative acknowledgement of a second type (NACK Type 2) if decoding is unsuccessful. A transmitter may treat NACK Type 1 and NACK Type 2 in similar manner and may send another transmission. In one design, the receiver may receive a first transmission of a packet and may send NACK Type 1 if high PAPR is detected for the first transmission. The receiver may decode the packet based on the first transmission if high PAPR is not detected and may send NACK Type 2 if the packet is decoded in error. The receiver may receive a second transmission of the packet if NACK Type 1 or NACK Type 2 is sent for the first transmission. The first and second transmissions may comprise different redundancy information for the packet and may have different PAPRs.

The transmitter may perform processing complementary to the processing performed by the receiver, as described below. Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies.

Figure 1:
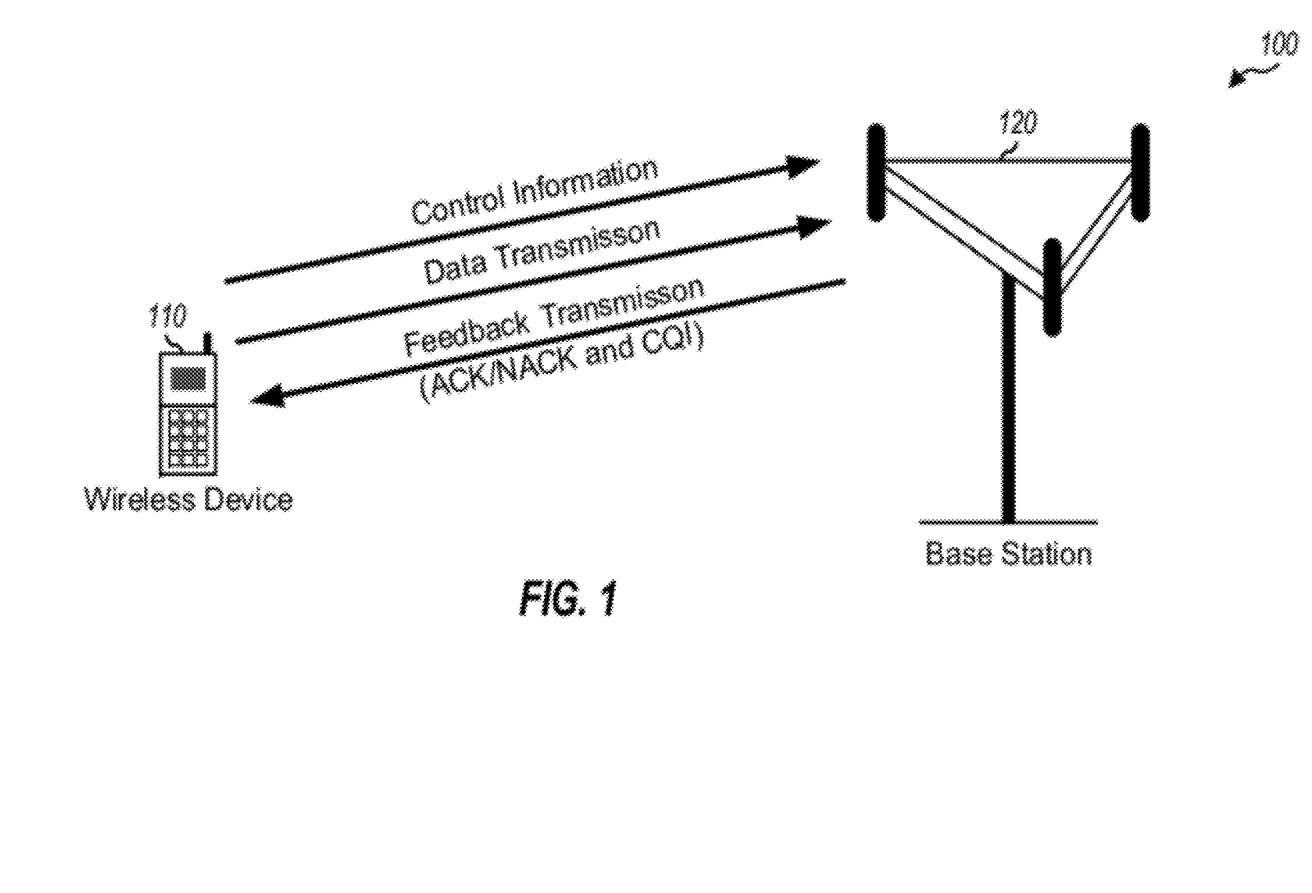
FIG. 1 shows a wireless communication system.

FIG. 1 shows a wireless communication system 100, which may include a number of base stations and other network entities. For simplicity, only one base station 120 is shown in FIG. 1. A base station is a station that communicates with wireless devices and may also be referred to as a Node B, an evolved Node B (eNB), an access point, etc. A base station may provide communication coverage for wireless devices within a particular geographic area.

A wireless device 110 may be stationary or mobile and may also be referred to as a mobile station, a user equipment (UE), a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, etc. Wireless device 110 may communicate with base station 120 via the downlink and uplink. The downlink (or forward link) refers to the communication link from the base station to the wireless device, and the uplink (or reverse link) refers to the communication link from the wireless device to the base station.

FIG. 1 also shows exemplary data transmission on the uplink from wireless device 110 to base station 120. Wireless device 110 may send data and control information on the uplink to base station 120. Base station 120 may send feedback information on the downlink to wireless device 110 to support data transmission on the uplink. The feedback information may comprise channel quality indicator (CQI) indicative of the quality of a communication channel between wireless device 110 and base station 120, ACK for packets received correctly by base station 120, NACK for packets received in error by base station 120, and/or other information.

Data transmission on the downlink from base station 120 to wireless device 110 may occur in similar manner. Base station 120 may send data and control information on the downlink to wireless 110. Wireless device 110 may send feedback information on the uplink to base station 120 to support data transmission on the downlink. System 100 may support HARQ for data transmission on the downlink and/or the uplink to improve reliability of data transmission.

System 100 may utilize orthogonal frequency division multiplexing (OFDM) and/or single-carrier frequency division multiplexing (SC-FDM). For example, system 100 may be an LTE system that supports OFDM on the downlink and SC-FDM on the uplink. System 100 may also be a WiMAX system or a Wi-Fi system that supports OFDM on both the downlink and uplink. In any case, OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM.

OFDM and SC-FDM have certain desirable characteristics such as the ability to combat multipath effects. However, a major drawback with OFDM, and to a lesser extend with SC-FDM, is a high PAPR of an output signal, which means that the ratio of the peak power to the average power of the output signal can be high. For OFDM, the $N_{FFT}$ total subcarriers may be independently modulated with data, and high PAPR may result from possible in-phase addition of all of the subcarriers when they are independently modulated with data. In fact, it can be shown that the peak power may be up to Q times larger than the average power for OFDM, where Q is the number of subcarriers used for transmission.

A high PAPR of an output signal normally requires a power amplifier at a transmitter to be operated at an average power level that may be much lower than the peak power level, i.e., backed off from peak power. This is because large peaks in the output signal may cause the power amplifier to operate in a highly non-linear region or possibly clip, which may then cause intermodulation distortion and other artifacts that may degrade performance. By operating the power amplifier at a back-off from peak power, the power amplifier can handle large peaks in the output signal without generating excessive distortion. However, the back-off represents inefficient operation of the power amplifier during other times when large peaks are not present in the output signal. High PAPR may be addressed as described below.

In an aspect, a receiver may perform PAPR detection to detect for high PAPR of a transmission of a packet. The receiver may send NACK Type 1 if high PAPR is detected and may decode the packet if high PAPR is not detected. The receiver may send NACK Type 2 if decoding is unsuccessful and may send ACK if decoding is successful. A transmitter may send another transmission of the packet if NACK Type 1 or NACK Type 2 is received from the receiver.

Figure 2:
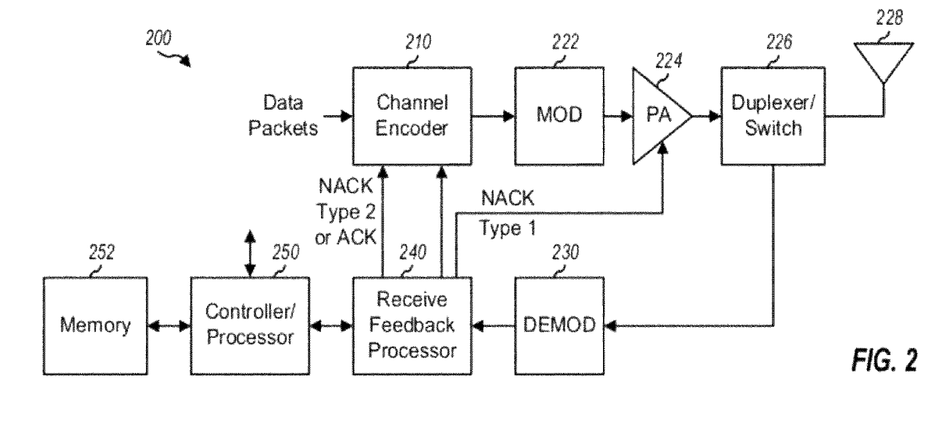
FIG. 2 shows a transmitter that supports two-level ACK/NACK feedback.

FIG. 2 shows a block diagram of an exemplary design of a transmitter 200 that supports two-level ACK/NACK feedback. Transmitter 200 may be part of wireless device 110 for data transmission on the uplink and may be part of base station 120 for data transmission on the downlink.

Within transmitter 200, a channel encoder 210 may receive packets of data to send to a receiver and may process each packet to obtain a corresponding coded packet. For example, channel encoder 210 may generate a cyclic redundancy check (CRC) for each packet, append the CRC to the packet, and encode the packet and the CRC (e.g., with a convolutional code, a Turbo code, a low density parity check (LDPC) code, a block code, and/or some other code) to obtain a coded packet. For HARQ, channel encoder 210 may partition the coded packet into multiple blocks of code bits, one block for each HARQ transmission. Each block may include different code bits (i.e., different redundancy information) for the packet. Channel encoder 210 may interleave (or reorder) each block of code bits and may map the interleaved bits to data symbols. Channel encoder 210 may also process control information to obtain control symbols. As used herein, a data symbol is a symbol for data, a control symbol is a symbol for control information, a pilot symbol is a symbol for pilot or reference signal, and a symbol may be a real or complex value. Pilot is data that is known a priori by both a transmitter and a receiver.

A modulator (MOD) 222 may receive and multiplex the data symbols, the control symbols, and pilot symbols from channel encoder 210. Modulator 222 may perform modulation on the multiplexed symbols (e.g., for OFDM, SC-FDM, etc.) to obtain output samples. Modulator 222 may further condition (e.g., convert to analog, filter, amplify, and upconvert) the output samples to generate a modulated signal. The modulated signal may be amplified by a power amplifier (PA) 224, routed through a duplexer/switch 226 and transmitted via an antenna 228 to the receiver.

Antenna 228 may also receive a modulated signal from the receiver, and the received signal may be routed through duplexer/switch 226 and provided to a demodulator (DEMOD) 230. Demodulator 230 may condition (e.g., amplify, filter, downconvert, and digitize) the received signal to obtain input samples and may perform demodulation on the input samples (e.g., for OFDM, SC-FDM, etc.) to obtain received symbols. A receive feedback processor 240 may process the received symbols to recover feedback information sent by the receiver to transmitter 200. The feedback information may comprise CQI, ACK/NACK, etc. Transmitter 200 may control data transmission to the receiver based on the feedback information, as described below. A controller/processor 250 may direct the operation of various units at transmitter 200. A memory 252 may store data and program codes for transmitter 200.

Figure 3:
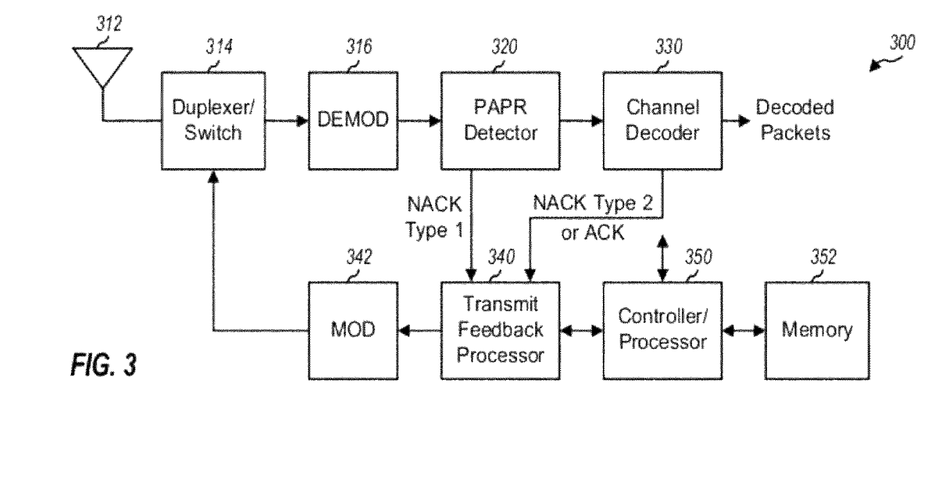
FIG. 3 shows a receiver that supports two-level ACK/NACK feedback.

FIG. 3 shows a block diagram of an exemplary design of a receiver 300 that supports two-level ACK/NACK feedback. Receiver 300 may be part of base station 120 for data transmission on the uplink and may be part of wireless device 110 for data transmission on the downlink.

At receiver 300, an antenna 312 may receive a modulated signal from transmitter 200 in FIG. 2, and the received signal may be routed through a duplexer/switch 314 and provided to a demodulator 316. Demodulator 316 may condition (e.g., amplify, filter, downconvert, and digitize) the received signal to obtain input samples. Demodulator 316 may further perform demodulation on the input samples (e.g., for OFDM, SC-FDM, etc.) to obtain received symbols.

A PAPR detector 320 may compute the PAPR of an HARQ transmission for a packet based on the input samples for the transmission, as follows:

$$PAPR = \frac{\max_k \{x_k^2\}}{P_{avg}}, \text{ and} \qquad \text{Eq (1)}$$

$$P_{avg} = \frac{1}{K} \cdot \sum_k x_k^2, \qquad \text{Eq (2)}$$

where $x_k$ denotes a complex value for the k-th input sample for the transmission, $P_{avg}$ is the average power of the transmission, and K denotes the number of input samples used to compute PAPR.

PAPR detector 320 may also compute the PAPR of the transmission in other manners, e.g., as described by Tarokh et al in a paper entitled "On the computation and reduction of the peak-to-average power ratio in multicarrier communications," IEEE Transactions on Communications, Volume 48, Issue 1, January 2000, pages 37-44.

In one design, PAPR detector 320 may compare the computed PAPR against a threshold and may detect high PAPR if the computed PAPR exceeds the threshold. If high PAPR is detected, then PAPR detector 320 may provide NACK Type 1. Conversely, if high PAPR is not detected, then a channel decoder 330 may process (e.g., symbol demap, de-interleave, and decode) the received symbols and provide a decoded packet. Channel decoder 330 may also check the decoded packet based on the CRC for the packet to determine whether the packet is decoded correctly or in error. Channel decoder 330 may provide NACK Type 2 if the packet is decoded in error and may provide ACK if the packet is decoded correctly.

A transmit feedback processor 340 may receive ACK/NACK from PAPR detector 320 and channel decoder 330 and CQI from a channel processor (not shown in FIG. 3). The feedback information may be processed (e.g., encoded and modulated) by processor 340, conditioned by a modulator 342, routed through duplexer/switch 314, and transmitted via antenna 312 to the transmitter. A controller/processor 350 may direct the operation of various units at receiver 300. A memory 352 may store data and program codes for receiver 300.

FIGS. 2 and 3 show exemplary designs of transmitter 200 and receiver 300 that support two-level ACK/NACK feedback. For the first level, PAPR detector 320 may determine the PAPR of a transmission of a packet and may compare the computed PAPR against one or more ranges of PAPR values. PAPR detector 320 may provide NACK Type 1 if high PAPR is detected, e.g., if the computed PAPR is higher than a threshold. Receiver 300 may send NACK Type 1 to transmitter 200, which may send another transmission of the packet and may also adjust the back-off of power amplifier 224 in response to NACK Type 1. Receiver 300 may skip decoding if NACK Type 1 is generated and sent.

For the second level, channel decoder 330 may decode the received symbols from PAPR detector 320 to obtain a decoded packet and may perform CRC check on the decoded packet. Channel decoder 330 may provide NACK Type 2 if the packet is decoded in error and may provide ACK if the packet is decoded correctly. Receiver 300 may send NACK Type 2 or ACK to transmitter 200. Transmitter 200 may send another transmission of the packet to receiver 300 in response to NACK Type 2 or may terminate transmission of the packet in response to ACK.

Figure 4:
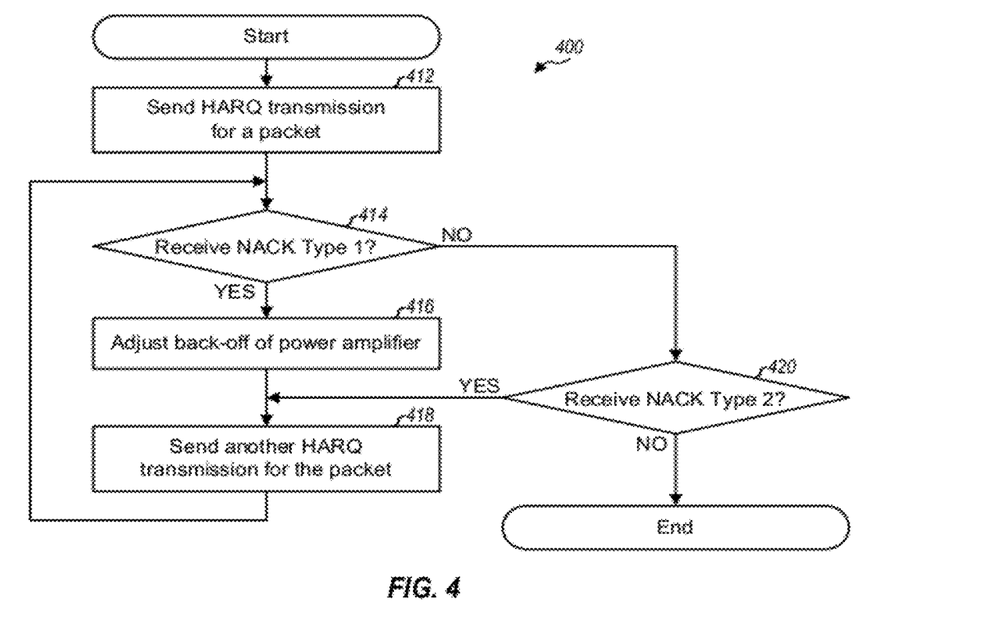
FIG. 4 shows a process performed by the transmitter.

FIG. 4 shows a flow diagram of an exemplary design of a process 400 performed by transmitter 200 in FIG. 2 to transmit a data packet. Initially, transmitter 200 may send a HARQ transmission for the packet to receiver 300 (block 412). Transmitter 200 may then receive ACK/NACK feedback from receiver 300. If NACK Type 1 is received (as determined in block 414), then transmitter 200 may adjust the back-off of its power amplifier and/or may perform other actions to mitigate high PAPR (block 416). For example, transmitter 200 may increase the back-off of its power amplifier and/or may operate at a lower average transmit power level if high PAPR is detected in order to prevent clipping and reduce intermodulation distortion. Transmitter 200 may send another HARQ transmission for the packet (block 418) and then return to block 414 to receive ACK/NACK feedback from receiver 300.

If NACK Type 1 is not received (as determined in block 414), then transmitter 200 may determine whether NACK Type 2 is received (block 420). If NACK Type 2 is received, then transmitter 200 may proceed to block 418 and send another HARQ transmission for the packet. Otherwise, if neither NACK Type 1 nor NACK Type 2 is received, then transmitter 200 may terminate transmission of the packet.

As shown in FIG. 4, transmitter 200 may treat both NACK Type 1 and NACK Type 2 in similar manner and may send another HARQ transmission if either NACK Type 1 or NACK Type 2 is received. Each HARQ transmission may include different coded data and may have different PAPR. Hence, high PAPR may be detected for one HARQ transmission but not for another HARQ transmission. As also shown in FIG. 4, transmitter 200 may mitigate high PAPR by adjusting the back-off of its power amplifier when high PAPR is detected. Transmitter 200 may also perform other actions to mitigate high PAPR or may perform nothing to mitigate high PAPR.

Figure 5:
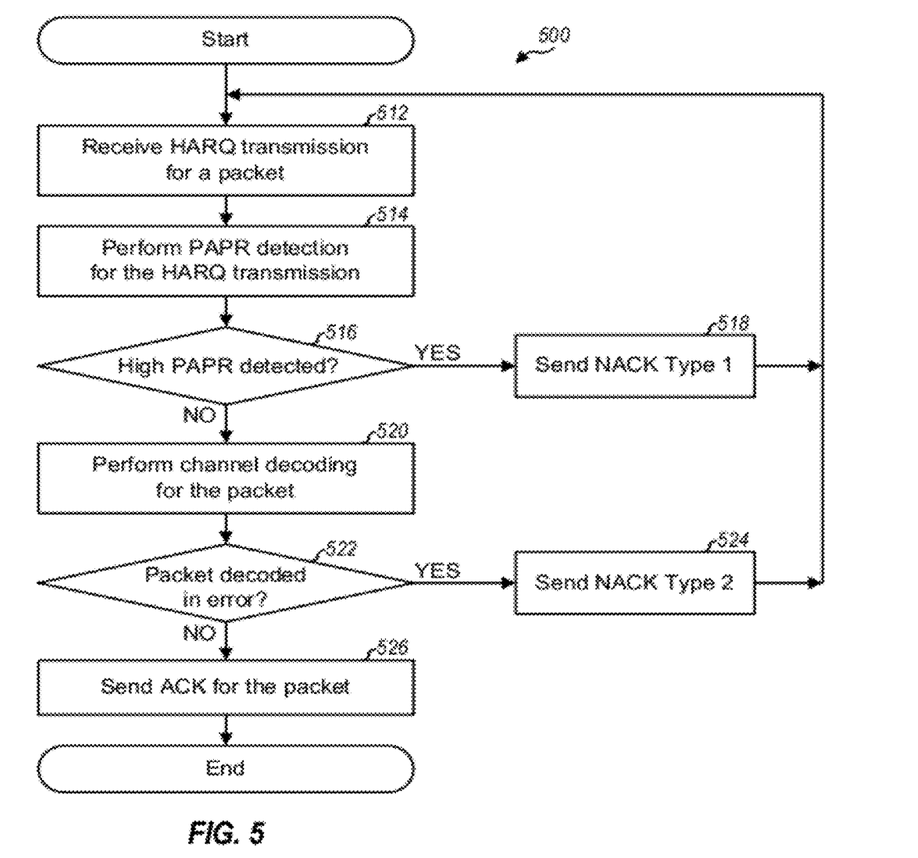
FIG. 5 shows a process performed by the receiver.

FIG. 5 shows a flow diagram of an exemplary design of a process 500 performed by receiver 300 in FIG. 3 for receiving a data packet. Initially, receiver 300 may receive an HARQ transmission for the packet from transmitter 200 (block 512). Receiver 300 may perform PAPR detection, compute the PAPR of the HARQ transmission, and determine whether high PAPR is detected (block 514). If high PAPR is detected (as determined in block 516), then receiver 300 may send NACK Type 1 to transmitter 200 (block 518) and may return to block 512 to receive another HARQ transmission for the packet.

If high PAPR is not detected (as determined in block 516), then receiver 300 may perform channel decoding for the packet based on all HARQ transmissions received for the packet (block 520). In one design, receiver 300 may give lower weight to received symbols from each HARQ transmission with high PAPR and may give higher weight to received symbols from each HARQ transmission without high PAPR. In another design, receiver 300 may give equal weight to received symbols from all HARQ transmissions, regardless of whether or not high PAPR is detected. In yet another design, receiver 300 may perform channel decoding based on only received symbols from HARQ transmissions without high PAPR and may discard (or give low weight to) received symbols from HARQ transmissions with high PAPR. For all designs, if the packet is decoded in error (as determined in block 522), then receiver 300 may send NACK Type 2 to transmitter 200 (block 524) and may return to block 512 to receive another HARQ transmission for the packet. Otherwise, if the packet is decoded correctly (as determined in block 522), then receiver 300 may send ACK to transmitter 200 (block 526) and may terminate reception of the packet.

As shown in FIG. 5, receiver 300 may perform two-level detection/decoding and may send NACK Type 1 for high PAPR or NACK Type 2 for decoding failure. However, receiver 300 may receive another HARQ transmission regardless of whether NACK Type 1 or NACK Type 2 is sent to transmitter 200.

FIG. 5 shows an exemplary design in which receiver 300 performs channel decoding if high PAPR is not detected. In another design, receiver 300 may skip decoding if high PAPR is detected for the first S HARQ transmissions and may perform channel decoding for each subsequent HARQ transmission even if high PAPR is detected, where S may be one or greater. Receiver 300 may also perform PAPR detection and channel decoding in other manners.

As shown in FIGS. 2 to 5, receiver 300 may perform two levels of detection/decoding even when transmitter 200 does not implement PAPR encoding for PAPR reduction. The first level of PAPR detection may be less computationally intensive, may be performed by a "front end" of receiver 300, and may have shorter delay. The second level of decoding may be more computationally intensive, may be performed by a "back end" of receiver 300, and may have longer delay. The second level of decoding may be more powerful but may likely fail when high PAPR is detected. Hence, sending NACK Type 1 for high PAPR may result in less delay for retransmission and may reduce computation at receiver 300. Sending NACK Type 2 for decoding failure may improve decoding performance due to retransmission. The two levels of detection/decoding may thus reduce delay and improve performance.

PAPR detection may be performed in various manners. In one design, receiver 300 may compute the PAPR of an HARQ transmission (e.g., as shown in equations (1) and (2)) and may compare the computed PAPR against a threshold. Receiver 300 may declare high PAPR if the computed PAPR exceeds the threshold. In one design, the threshold may be set based on decoding capability of channel decoder 330 at receiver 300. For example, computer simulation and/or empirical measurement may indicate that a PAPR of X or lower may result in high likelihood of correct decoding by channel decoder 330 when a target received signal quality or better is obtained by receiver 300. The threshold may then be set to X. Different thresholds may be used for different channel decoders for different coding schemes. Different thresholds may also be used for different channel decoders for a given coding scheme. The threshold may also be set based on channel conditions observed by receiver 300, the back-off factor used by transmitter 200, and/or other factors. For example, receiver 300 may determine that a PAPR of Y or lower may result in high likelihood of correct decoding based on its decoder capability, its channel conditions, and/or the back-off factor used by transmitter 200. The threshold may then be set to Y. In general, progressively higher threshold may be used for progressively more powerful decoding capability, which may be able to handle progressively more intermodulation distortion from higher PAPR. Progressively higher threshold may also be used for progressively higher received signal quality and/or progressively larger back-off factor used by transmitter 200.

In another design, transmitter 200 may compute the PAPR of an HARQ transmission and may send the PAPR to receiver 300. Transmitter 200 may send the PAPR on an inband channel along with the HARQ transmission, or a paging channel, or a dedicated PAPR channel, or some other channel. In this design, receiver 300 may receive the PAPR of the HARQ transmission from transmitter 200 and would not need to compute the PAPR. Receiver 300 may compare the received PAPR against the threshold, which may be set based on the decoding capability of receiver 300, the channel conditions observed by receiver 300, the back-off factor used by transmitter 200, and/or other factors. In this design, transmitter 200 may know one variable (e.g., the PAPR) and receiver 300 may know another variable (e.g., the threshold, which may be determined based on factors known to receiver 300). Receiver 300 may also detect for high PAPR in other manners.

Figure 6:
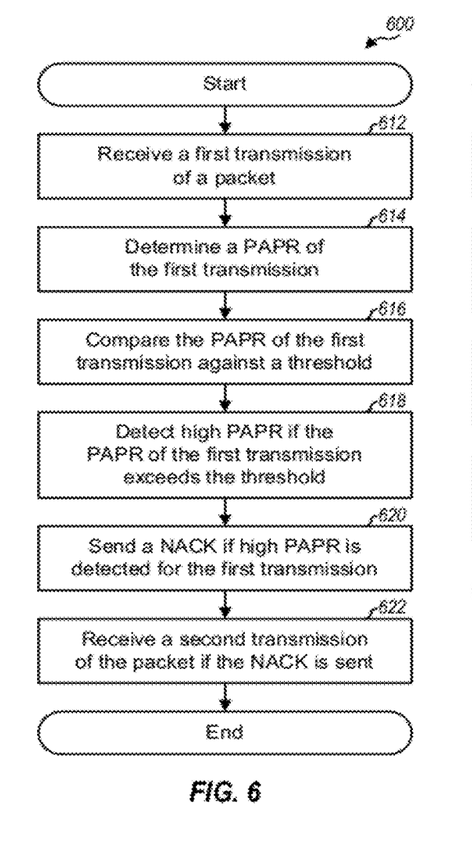
FIG. 6 shows a process for receiving data by the receiver.

FIG. 6 shows a flow diagram of a design of a process 600 for receiving data by a receiver, which may be part of a base station or a wireless device. The receiver may receive a first transmission of a packet (block 612) and may determine a PAPR of the first transmission (block 614). In one design, the receiver may compute the PAPR of the first transmission. In another design, the receiver may receive the PAPR of the first transmission from a transmitter. For both designs, the receiver may compare the PAPR of the first transmission against a threshold (block 616) and may detect high PAPR if the PAPR of the first transmission exceeds the threshold (block 618). The threshold may be determined based on decoding capability of the receiver, channel conditions observed by the receiver, a back-off factor used by the transmitter, and/or other factors.

The receiver may send a NACK if high PAPR is detected for the first transmission (block 620). The receiver may thereafter receive a second transmission of the packet if the NACK is sent (block 622). The first and second transmissions may comprise different redundancy information for the packet and may have different PAPRs. The receiver may decode the packet based on the first transmission if high PAPR is not detected. The receiver may send a NACK of another type if the packet is decoded in error.

Figure 7:
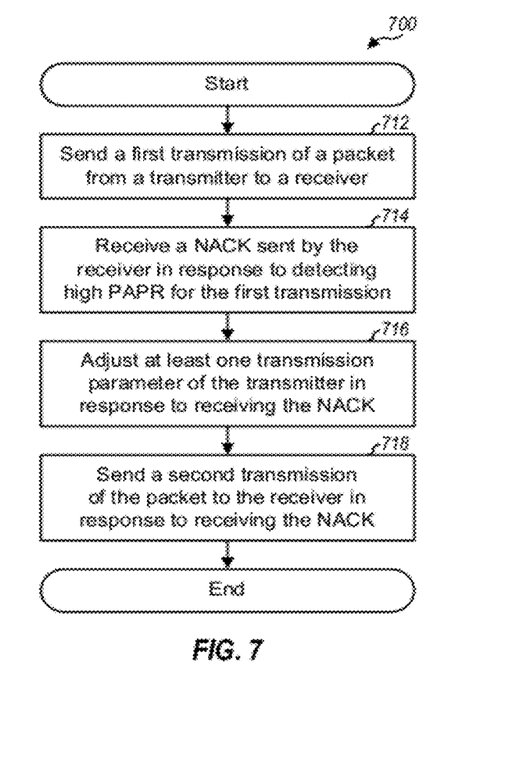
FIG. 7 shows a process for transmitting data by the transmitter.

FIG. 7 shows a flow diagram of a design of a process 700 for transmitting data by a transmitter, which may be part of a wireless device or a base station. The transmitter may send a first transmission of a packet to a receiver (block 712). In one design, the transmitter may compute a PAPR of the first transmission and may send the PAPR to the receiver. In another design, the transmitter may not compute nor send the PAPR to the receiver. The transmitter may receive a NACK sent by the receiver in response to detecting high PAPR for the first transmission (block 714). The transmitter may adjust at least one transmission parameter in response to receiving the NACK (block 716). In one design, the transmitter may adjust (e.g., increase) back-off of a power amplifier at the transmitter in response to receiving the NACK. The transmitter may send a second transmission of the packet to the receiver in response to receiving the NACK (block 718). The first and second transmissions may comprise different redundancy information for the packet and may have different PAPRs.

Figure 8:
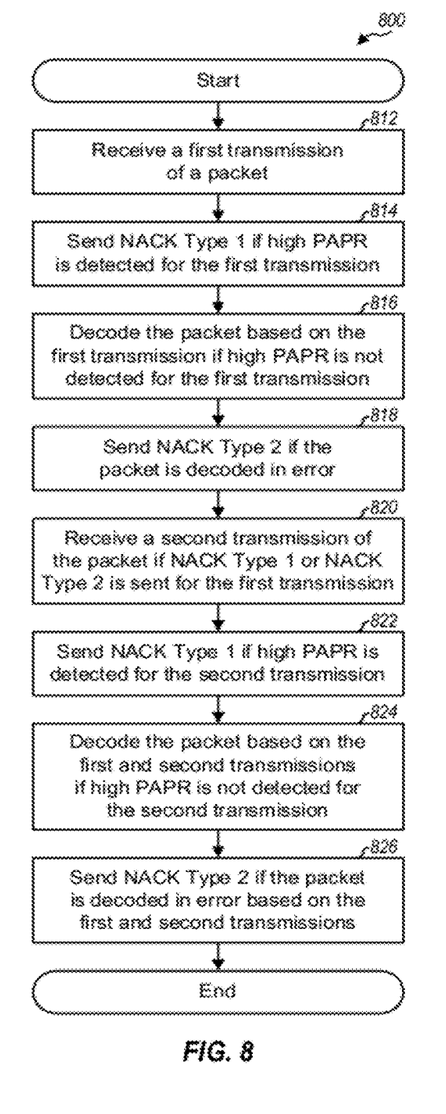
FIG. 8 shows another process for receiving data by the receiver.

FIG. 8 shows a flow diagram of a design of a process 800 for receiving data by a receiver. The receiver may receive a first transmission of a packet from a transmitter (block 812). The receiver may send NACK Type 1 if high PAPR is detected for the first transmission (block 814). The receiver may skip decoding of the packet if high PAPR is detected for the first transmission.

The receiver may decode the packet based on the first transmission if high PAPR is not detected for the first transmission (block 816). The receiver may send NACK Type 2 if the packet is decoded in error (block 818). The receiver may send NACK Type 1 with a first delay and may send NACK Type 2 with a second delay. The second delay may be longer than the first delay or may be equal to the first delay.

The receiver may receive a second transmission of the packet if NACK Type 1 or NACK Type 2 is sent for the first transmission (block 820). The first and second transmissions may be two HARQ transmissions for the packet, may comprise different redundancy information for the packet, and may have different PAPRs. The receiver may send NACK Type 1 if high PAPR is detected for the second transmission (block 822). The receiver may skip decoding of the packet if high PAPR is detected for the second transmission. The receiver may decode the packet based on the first and second transmissions if high PAPR is not detected for the second transmission (block 824). The receiver may send NACK Type 2 if the packet is decoded in error based on the first and second transmissions (block 826). The receiver may receive another transmission of the packet if NACK Type 1 or NACK Type 2 is sent for the second transmission.

In one design of block 824, the receiver may weigh the first transmission with a first weight and may weigh the second transmission with a second weight. The first weight may be less than the second weight if high PAPR is detected for the first transmission but not for the second transmission. The first weight may also be equal to the second weight regardless of whether high PAPR is detected for any transmission. The receiver may decode the packet based on the weighted first and second transmissions.

Figure 9:
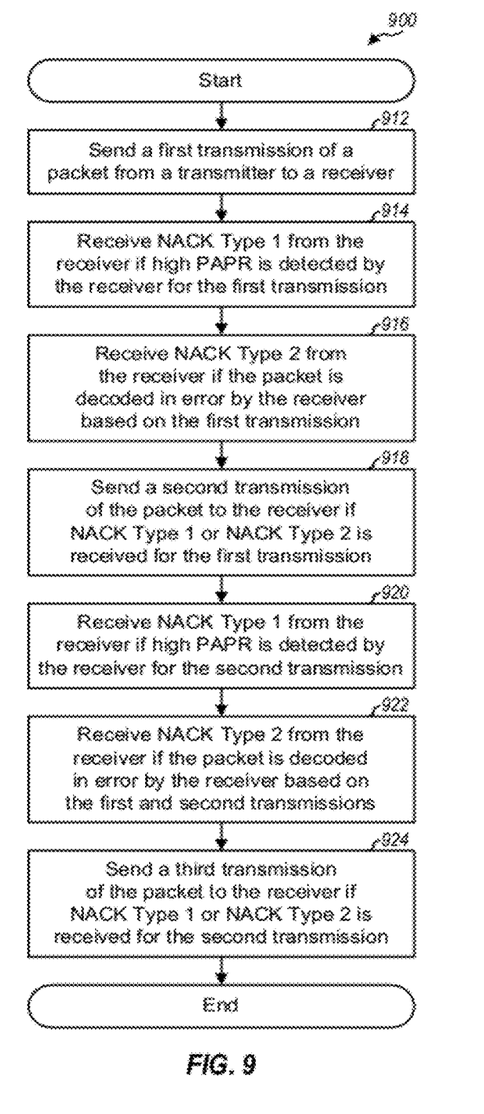
FIG. 9 shows another process for transmitting data by the transmitter.

FIG. 9 shows a flow diagram of a design of a process 900 for transmitting data by a transmitter. The transmitter may send a first transmission of a packet to a receiver (block 912). The transmitter may receive NACK Type 1 from the receiver if high PAPR is detected by the receiver for the first transmission (block 914). The transmitter may receive NACK Type 2 from the receiver if the packet is decoded in error by the receiver based on the first transmission (block 916).

The transmitter may send a second transmission of the packet to the receiver if NACK Type 1 or NACK Type 2 is received for the first transmission (block 918). The first and second transmissions may be two HARQ transmissions for the packet, may comprise different redundancy information for the packet, and may have different PAPRs. The transmitter may adjust at least one transmission parameter (e.g., back-off of a power amplifier) in response to receiving NACK Type 1 for the first transmission.

The transmitter may receive NACK Type 1 from the receiver if high PAPR is detected by the receiver for the second transmission (block 920). The transmitter may receive NACK Type 2 from the receiver if the packet is decoded in error by the receiver based on the first and second transmissions (block 922). The transmitter may send a third transmission of the packet to the receiver if NACK Type 1 or NACK Type 2 is received for the second transmission (block 924).

In one design, the transmitter may encode the packet based on a coding scheme to obtain a coded packet. The transmitter may partition the coded packet into a plurality of blocks, with each block comprising different redundancy information for the packet. The transmitter may generate different transmissions of the packet based on different ones of the plurality of blocks. The transmitter may also generate different transmissions of the packet in other manners.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving a first transmission of a packet;
determining a peak-to-average-power ratio (PAPR) of the first transmission; and
sending a negative acknowledgement (NACK) in response to determining that the PAPR is greater than a threshold.

2. The method of claim 1, wherein the determining the PAPR of the first transmission comprises computing the PAPR of the first transmission.

3. The method of claim 1, wherein the determining the PAPR of the first transmission comprises receiving the PAPR of the first transmission from a transmitter, the PAPR being computed by the transmitter.

4. The method of claim 1, wherein the threshold is determined based on decoding capability of a receiver.

5. The method of claim 1, wherein the threshold is determined based on channel conditions observed by a receiver, a back-off factor used by a transmitter, or a combination thereof.

6. The method of claim 1, further comprising:
receiving a second transmission of the packet in response to sending the NACK, wherein the first and second transmissions include different redundancy information for the packet and have different PAPRs.

7. The method of claim 1, further comprising:
decoding the packet based on the first transmission in response to determining that the PAPR is not greater than the threshold; and
sending a NACK of another type in response to determining that the packet is decoded in error.

8. The method of claim 1, wherein the PAPR is determined based on input samples of the first transmission.

9. The method of claim 8, wherein the PAPR corresponds to a ratio of an average transmit power of the first transmission to the input samples.

10. An apparatus, comprising:
means for receiving a first transmission of a packet;
means for determining a peak-to-average-power ratio (PAPR) of the first transmission; and
means for sending a negative acknowledgement (NACK) in response to determining that the PAPR is greater than a threshold.

11. An apparatus, comprising:
at least one processor configured to:
receive a first transmission of a packet,
determine a peak-to-average-power ratio (PAPR) of the first transmission, and
send a negative acknowledgement (NACK) in response to determining that the PAPR is greater than a threshold.

12. The apparatus of claim 11, wherein the at least one processor is further configured to compare the PAPR of the first transmission against the threshold.

13. The apparatus of claim 11, wherein the at least one processor is configured to receive a second transmission of the packet in response to sending the NACK, and wherein the first and second transmissions include different redundancy information for the packet and have different PAPRs.

14. A computer program product, comprising:
a computer-readable medium comprising:
code for causing at least one computer to receive a first transmission of a packet,
code for causing the at least one computer to determine a peak-to-average-power ratio (PAPR) of the first transmission, and
code for causing the at least one computer to send a negative acknowledgement (NACK) in response to determining that the PAPR is greater than a threshold.

15. A method, comprising:
sending a first transmission of a packet from a transmitter to a receiver;
receiving a negative acknowledgement (NACK) sent by the receiver in response to determining that a peak-to-average-power ratio (PAPR) of the first transmission is greater than a threshold; and
sending a second transmission of the packet to the receiver in response to receiving the NACK, wherein the first and second transmissions include different redundancy information for the packet and have different PAPRs.

16. The method of claim 15, further comprising:
adjusting at least one transmission parameter of the transmitter in response to receiving the NACK.

17. The method of claim 16, wherein the adjusting at least one transmission parameter comprises adjusting back-off of a power amplifier at the transmitter.

18. The method of claim 15, further comprising:
computing the PAPR of the first transmission by the transmitter; and
sending the PAPR of the first transmission from the transmitter to the receiver.

19. An apparatus, comprising:
means for sending a first transmission of a packet from a transmitter to a receiver;
means for receiving a negative acknowledgement (NACK) sent by the receiver in response to determining that a peak-to-average-power ratio (PAPR) of the first transmission is greater than a threshold; and
means for sending a second transmission of the packet to the receiver in response to receiving the NACK, wherein the first and second transmissions include different redundancy information for the packet and have different PAPRs.

20. The apparatus of claim 19, further comprising:
means for adjusting at least one transmission parameter of the transmitter in response to receiving the NACK.

21. The apparatus of claim 20, wherein the means for adjusting at least one transmission parameter comprises means for adjusting back-off of a power amplifier at the transmitter.

22. A method, comprising:
receiving a first transmission of a packet;
sending a negative acknowledgement of a first type (NACK Type 1) in response to determining that a peak-to-average-power ratio (PAPR) of the first transmission is greater than a threshold;
decoding the packet based on the first transmission in response to determining that the PAPR is not greater than the threshold;
sending a negative acknowledgement of a second type (NACK Type 2) in response to determining that the packet is decoded in error; and
receiving a second transmission of the packet in response to sending the NACK Type 1 or the NACK Type 2, wherein the first and second transmissions include different redundancy information for the packet and have different PAPRs.

23. The method of claim 22, further comprising:
skipping decoding of the packet in response to determining that the PAPR is greater than the threshold.

24. The method of claim 22, further comprising:
sending a second NACK Type 1 in response to determining that a second PAPR of the second transmission is greater than the threshold;
decoding the packet based on the first and second transmissions in response to determining that the second PAPR is not greater than the threshold; and
sending a second NACK Type 2 in response to determining that the packet is decoded in error based on the first and second transmissions.

25. The method of claim 24, further comprising:
skipping decoding of the packet in response to determining that the second PAPR is greater than the threshold.

26. The method of claim 24, wherein the decoding the packet based on the first and second transmissions comprises:
weighting the first transmission with a first weight,
weighting the second transmission with a second weight, wherein the first weight is less than the second weight when the PAPR is greater than the threshold and the second PAPR is not greater than the threshold, and
decoding the packet based on the weighted first and second transmissions.

27. The method of claim 22, wherein the NACK Type 1 is sent with a first delay, and wherein the NACK Type 2 is sent with a second delay longer than the first delay.

28. The method of claim 22, wherein the first and second transmissions of the packet are two hybrid automatic retransmission (HARQ) transmissions for the packet.

29. An apparatus, comprising:
means for receiving a first transmission of a packet;
means for sending a negative acknowledgement of a first type (NACK Type 1) in response to determining that a peak-to-average-power ratio (PAPR) of the first transmission is greater than a threshold;
means for decoding the packet based on the first transmission in response to a determination that the PAPR is not greater than the threshold;
means for sending a negative acknowledgement of a second type (NACK Type 2) in response to a determination that the packet is decoded in error; and
means for receiving a second transmission of the packet in response to sending the NACK Type 1 or the NACK Type 2, wherein the first and second transmissions include different redundancy information for the packet and have different PAPRs.

30. The apparatus of claim 29,
wherein the means for decoding skips decoding of the packet in response to determining that the PAPR is greater than the threshold.

31. The apparatus of claim 29, further comprising:
means for sending a second NACK Type 1 in response to determining a second PAPR of the second transmission is greater than the threshold;
means for decoding the packet based on the first and second transmissions in response to determining that the second PAPR is not greater than the threshold; and
means for sending a second NACK Type 2 in response to determining that the packet is decoded in error based on the first and second transmissions.

32. The apparatus of claim 31, wherein the means for decoding the packet based on the first and second transmissions comprises:
means for weighting the first transmission with a first weight, means for weighting the second transmission with a second weight, wherein the first weight is less than the second weight when the PAPR is greater than the threshold and the second PAPR is not greater than the threshold, and
means for decoding the packet based on the weighted first and second transmissions.

33. A method, comprising:
sending a first transmission of a packet from a transmitter to a receiver;
receiving a negative acknowledgement of a first type (NACK Type 1) from the receiver in response to a determining that a peak-to-average-power ratio (PAPR) of the first transmission is greater than a threshold;
receiving a negative acknowledgement of a second type (NACK Type 2) from the receiver in response to a determination that the packet is decoded in error based on the first transmission; and
sending a second transmission of the packet from the transmitter to the receiver in response to receiving the NACK Type 1 or the NACK Type 2, wherein the first and second transmissions include different redundancy information for the packet and have different PAPRs.

34. The method of claim 33, further comprising:
encoding the packet based on a coding scheme to obtain a coded packet;
partitioning the coded packet into a plurality of blocks, each block comprising different redundancy information for the packet; and
generating the first and second transmissions of the packet based on different ones of the plurality of blocks.

35. The method of claim 33, further comprising:
adjusting at least one transmission parameter of the transmitter in response to receiving the NACK Type 1.

36. The method of claim 33, further comprising:
receiving a second NACK Type 1 from the receiver in response to a determination that a second PAPR is greater than the threshold;
receiving a second NACK Type 2 from the receiver in response to a determination that the packet is decoded in error based on the first and second transmissions; and
sending a third transmission of the packet from the transmitter to the receiver in response to receiving the second NACK Type 1 or the second NACK Type 2, wherein the first, second and third transmissions include different redundancy information for the packet and have different PAPRs.

37. An apparatus, comprising:

means for sending a first transmission of a packet from a transmitter to a receiver;

means for receiving a negative acknowledgement of a first type (NACK Type 1) from the receiver in response to a determination that a peak-to-average-power ratio (PAPR) of the first transmission is greater than a threshold;

means for receiving a negative acknowledgement of a second type (NACK Type 2) from the receiver in response to a determination that the packet is decoded in error based on the first transmission; and means for sending a second transmission of the packet from the transmitter to the receiver in response to receiving the NACK Type 1 or the NACK Type 2, wherein the first and second transmissions include different redundancy information for the packet and have different PAPRs.

38. The apparatus of claim 37, further comprising:

means for encoding the packet based on a coding scheme to obtain a coded packet;

means for partitioning the coded packet into a plurality of blocks, each block comprising different redundancy information for the packet; and means for generating the first and second transmissions of the packet based on different ones of the plurality of blocks.

39. The apparatus of claim 37, further comprising:

means for adjusting at least one transmission parameter of the transmitter in response to receiving the NACK Type 1.

40. The apparatus of claim 37, further comprising:

means for receiving a second NACK Type 1 from the receiver in response to a determination that a second PAPR of the second transmission is greater than the threshold;

means for receiving a second NACK Type 2 from the receiver in response to a determination that the packet is decoded in error based on the first and second transmissions; and means for sending a third transmission of the packet from the transmitter to the receiver in response to receiving the second NACK Type 1 or the second NACK Type 2, wherein the first, second and third transmissions include different redundancy information for the packet and have different PAPRs.

\* \* \* \* \*